United States Patent
Tapia

(10) Patent No.: US 12,222,440 B2
(45) Date of Patent: Feb. 11, 2025

(54) HIGH-RESOLUTION RADAR TARGET SIGNATURE SMEARING CORRECTION

(71) Applicant: GM Cruise Holdings LLC, San Francisco, CA (US)

(72) Inventor: Daniel Flores Tapia, Fairfield, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 580 days.

(21) Appl. No.: 17/552,627

(22) Filed: Dec. 16, 2021

(65) Prior Publication Data

US 2023/0194661 A1 Jun. 22, 2023

(51) Int. Cl.
*G01S 13/89* (2006.01)
*G01S 7/40* (2006.01)
*G01S 13/931* (2020.01)

(52) U.S. Cl.
CPC ............ *G01S 7/4021* (2013.01); *G01S 13/89* (2013.01); *G01S 13/931* (2013.01)

(58) Field of Classification Search
CPC ...... G01S 13/42; G01S 13/582; G01S 13/584; G01S 13/89; G01S 13/931; G01S 7/292; G01S 7/354; G01S 7/4021
See application file for complete search history.

(56) References Cited

U.S. PATENT DOCUMENTS

2016/0223649 A1 * 8/2016 Schwindt .............. G01S 7/4026

* cited by examiner

Primary Examiner — Timothy A Brainard
(74) Attorney, Agent, or Firm — Michael DiCato

(57) ABSTRACT

A radar apparatus at a vehicle may transmit a set of radar energy that is reflected off an object after which the reflected radar energy may be received at the radar apparatus. When relative motion of a radar apparatus and an object include movement in two different directions, power of the reflected radar signals may be spread out in a manner that makes data associated with the reflected radar signals difficult to interpret. This spreading out of the radar signals can make mappings of the received radar data appear to be smeared or distorted. To compensate for this smearing effect, mappings of this smeared radar data may be compared with curves from which compensation factors may be identified. These compensation factors may allow a processor to perform calculations to generate updated mappings of the radar data that may allow the processor to more accurately identify characteristics of the object.

11 Claims, 5 Drawing Sheets

HIGH-RESOLUTION RADAR TARGET SIGNATURE SMEARING CORRECTION

BACKGROUND

1. Technical Field

The present disclosure is generally related to interpreting received sets of radar data. More specifically, the present disclosure is directed to solutions for reducing smearing effects often associated with signals that have been reflected off objects in the field of view of a radar apparatus.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

SUMMARY

The present disclosure is directed to systems, apparatus, methods, and non-transitory computer-readable medium that process received radar signals. A method consistent with the present disclosure may receive radar signals reflected off a first object having a relative motion with respect to an antenna of a radar apparatus that points in a first direction. These received radar signals may include a component that indicates that the first object has a relative motion in a second direction that is different from the first direction where the antenna of the radar apparatus points. This relative motion may result in power of the received radar signals being distributed in a first mapping of the radar signals that includes a first number of points. This present method may include identifying that the first number of points of the first mapping corresponds to a first curve associated with a first parameter, identifying a compensation factor associated with the first parameter based on the association of the curve with the first parameter, and performing calculations that apply the compensation factor associated with the first parameter to the first mapping of points to generate a second mapping of the radar signals that includes a second number of points. Here, the second number of points may be fewer than the first number of points based on the compensation factor being applied in the calculations. This method may also include identifying a distance and velocity to associate with the relative motion based on the second mapping of the radar signals.

The present disclosure is directed to a non-transitory computer-related storage medium, wherein a processor may execute instructions to prepare to process received radar signals reflected off a first object having a relative motion with respect to an antenna of a radar apparatus that points in a first direction. These received radar signals may include a component that indicates that the first object has a relative motion in a second direction that is different from the first direction where the antenna of the radar apparatus points. This relative motion may result in power of the received radar signals being distributed in a first mapping of the radar signals that includes a first number of points. This present method may include identifying that the first number of points of the first mapping correspond to a first curve associated with a first parameter, identifying a compensation factor associated with the first parameter based on the association of the curve with the first parameter, and performing calculations that apply the compensation factor associated with the first parameter to the first mapping of points to generate a second mapping of the radar signals that includes a second number of points. Here, the second number of points may be fewer than the first number of points based on the compensation factor being applied in the calculations. This method may also include identifying a distance and velocity to associate with the relative motion based on the second mapping of the radar signals.

An apparatus consistent with the present disclosure may include a radar apparatus that transmits radar signals and that receives the radar signals after those radar signals have been reflected off a first object. Here, the first object has a relative motion with respect to an antenna of the radar apparatus that points in a first direction, the radar signals may include a component that indicates that the first object has a relative motion in a second direction that is different from the first direction where the antenna of the radar apparatus points. This relative motion may result in power of the received radar signals being distributed in a first mapping of the radar signals that includes a first number of points. This apparatus may include a memory and a processor that executes instructions out of the memory to identify that the first number of points of the first mapping correspond to a first curve associated with a first parameter, identify a compensation factor associated with the first parameter based on the association of the curve with the first parameter, perform calculations that apply the compensation factor associated with the first parameter to the first mapping of points to generate a second mapping of the radar signals that includes a second number of points. The second number of points may be fewer than the first number of points based on the compensation factor being applied in the calculations. The processor of the radar apparatus may then identify a distance and velocity to associate with the relative motion based on the second mapping of the radar signals.

DETAILED DESCRIPTION

Figure 1:
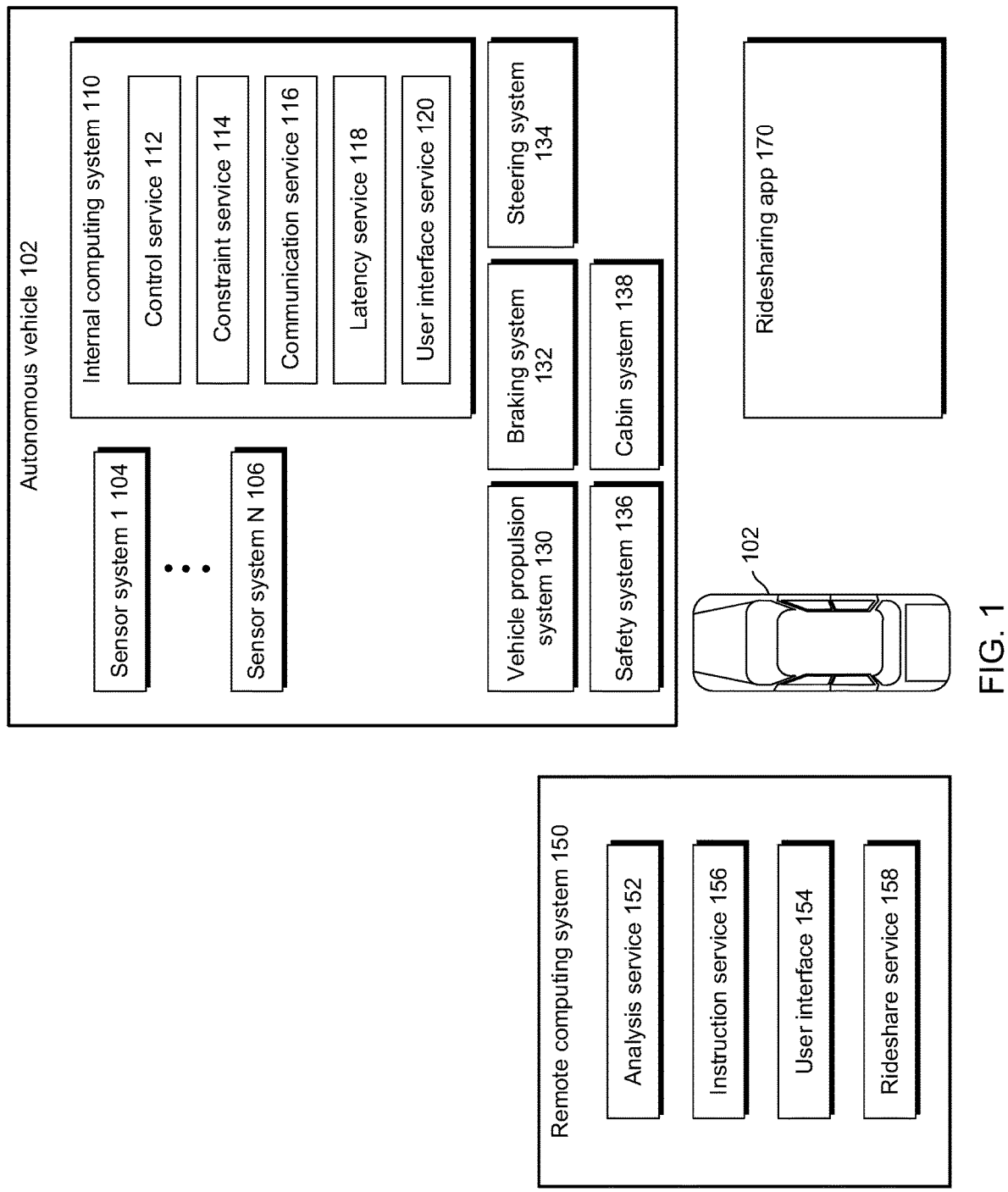
FIG. 1 illustrates environment 100 that includes an autonomous vehicle 102 in communication with a computing system 150 in accordance with some aspects of the present technology.

A radar apparatus installed at a vehicle commonly include antennas that point in a direction in front of the vehicle. As the vehicle moves along a roadway emitting electromagnetic (EM) energy and receiving reflected EM energy, fixed locations of antenna(s) of the radar apparatus commonly result in the received EM energy being spread out or smeared. This is because a forward-facing antenna of the radar apparatus points in a first direction, and objects within the field of view of the radar apparatus often move in a second direction that is not the same as the first direction. After a radar signal is received, a processor of the radar apparatus may generate a mapping of the received radar signal that is spread out (smeared) as compared to the mapping of radar signals when there is no relative motion between the radar apparatus and an object.

Such smearing effects may result in the radar apparatus not accurately identifying what the object is and may cause the radar apparatus to make errors when identifying a velocity or location to associate with the object. New apparatus and methods are needed to mitigate the smearing of radar signals received by a radar apparatus.

The present disclosure is directed to reducing smearing effects commonly associated with received radar signals. A radar apparatus of a vehicle may transmit a set of radar energy that is reflected off an object after which the reflected radar energy may be received at the radar apparatus. When relative motion of a radar apparatus and an object include movement in two different directions, power of the reflected radar signals may be spread out in a manner that makes data associated with the reflected radar signals difficult to interpret. This spreading out of the radar signals can make mappings of the received radar data appear to be blurred, smeared, or distorted as compared to radar signals reflecting off objects that move in the same direction and speed as the radar apparatus. To compensate for this smearing effect, mappings of this smeared radar data may be compared with curves from which compensation factors may be identified. These compensation factors may allow a processor to perform calculations to generate updated mappings of the radar data that correspond to signatures of known objects, and information associated with the updated mappings may allow the processor to more accurately interpret distances and speeds associated with objects in the field of view of the radar apparatus.

The spreading out of the reflected radar waves (or power of these waves) results in the radar apparatus receiving radar signals that are not consistent with reflections of radar data when there is no relative motion between a radar apparatus and the object. Mappings of received radar signals that do not include relative motion may be used to identify signatures of specific types of objects, and these signatures may be used to identify those specific types of objects. For example, different radar signatures may be associated with a person, a car, a truck, a bicycle, or a person riding a bicycle. These signatures may be stored in memory or be used to train an artificially intelligent system such that objects associated with the signatures may be identified. Conventional radar apparatus may not be able to identify particular types of objects when distorted, blurred, or smeared radar data is received. Simply put, a smeared image may not be discernable. Methods of the present disclosure are be directed to reducing or eliminating this smearing effect by compensating for this smearing effect mathematically.

FIG. 1 illustrates environment 100 that includes an autonomous vehicle 102 in communication with a computing system 150. The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 102 through an Nth sensor system 104). The sensor systems 104-106 are of different types and are arranged about the autonomous vehicle 102. For example, the first sensor system 104 may be a camera sensor system and the Nth sensor system 106 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally includes an internal computing system 110 that is in communication with the sensor systems 104-106 and the mechanical systems 130, 132, 134. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 106, the braking system 108, the steering system 110, the safety system 136, and the cabin system 138. The control service 112 receives sensor signals from the sensor systems 102-104 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remoting computing system or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Methods of the present disclosure may be implemented by an apparatus that transmits electromagnetic energy, receives reflected electromagnetic energy, and processes data associated with the received electromagnetic energy. Such an apparatus may transmit and receive signals in one or more different bands of the electromagnetic spectrum. For example, a radar apparatus may be any one of a set of different bands of electromagnetic energy that may include the Ku band (using signals ranging from 12.5 gigahertz (GHz) to 18 GHZ), the K band (using signals ranging from 18 GHz to 26.5 GHZ), the Ka band (using signals ranging from 26.5 GHz to 40 GHz), and or the millimeter band (using signals ranging from 40 GHz to 100 GHz).

Figure 2:
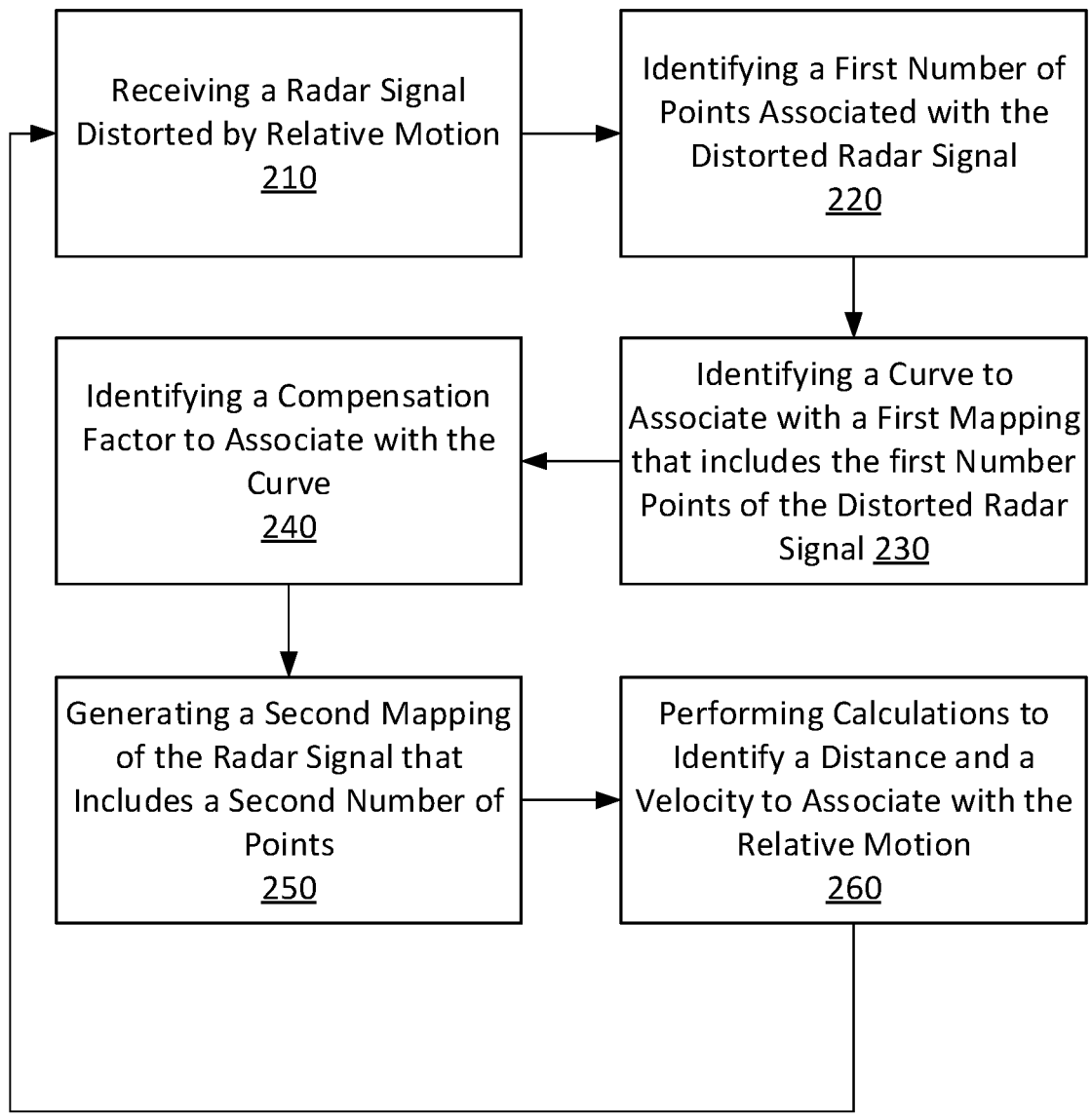
FIG. 2 illustrates an exemplary set of steps that may be performed when smeared (i.e., distorted) radar signals are received by a radar apparatus in accordance with some aspects of the present technology.

FIG. 2 illustrates an exemplary set of steps that may be performed when smeared (i.e., distorted) radar signals are received by a radar apparatus. The reflected radar signal may be received after being transmitted from an antenna of the radar apparatus, and after that, the transmitted signal bounces off an object. FIG. 2 begins with step 210 where the radar apparatus receive a smeared radar signal. An antenna of the radar apparatus may receive this smeared radar signal and a combination of electronic hardware (e.g. analog and/or digital) may prepare this signal to be evaluated by a processor executing instructions out of a memory.

Smearing effects (or distortion) of the reflected radar signal may be greater when the relative motion includes larger components of oblique or perpendicular relative velocities between the radar apparatus antenna and the object as compared smaller components. Furthermore, a radar apparatus would perceive little or no smearing when the radar apparatus is moving in a same direction and speed as an object off which radar signals have been reflected.

After the smeared or distorted radar signal is received in step 210 and data associated with the distorted radar signal has been prepared for analysis, a processor executing instructions out of a memory may identify a first characteristic of the received (distorted) radar signal in step 220 of FIG. 2. This first characteristic may include a first number of points that correspond to a type of curve when mapped. The processor may then execute instructions out of a memory to evaluate the first number of points of the received radar signal. The evaluation performed in step 230 may generate a first mapping of the received distorted radar signal, and the processor executing instructions out of the memory may then identify a curve to associate with the received distorted radar signal.

As noted above, this first number of points may correspond to a first mapping of the received distorted radar signal. The process of mapping received radar data may include applying an adaptive threshold to a magnitude of radar responses to generate a range-doppler map of the received radar data. This adaptive threshold is calculated by determining the minimum points in the Range-Doppler map power histogram. The power histogram is a quantification of the different signal levels in the received dataset, this allows us to discriminate deterministic object responses from environmental clutter. Certain sets of data may be identified as being a signature. When a signature is above a threshold value, that signature may be labeled such that further analysis may be performed.

Curves associated with reflected radar signals may be a line, a hyperbola, or a parabola. Here, lines may be associated with fast-moving objects, hyperbolas may be associated with (relatively) stationary objects, and parabolas may be associated with slow-moving objects. Different types of curves that are included in a mapping of received radar signals may be represented by different equations that each include different parameters. These parameters may be related to locations in two or three-dimensional space and possibly to other factors. Example equations for a line, a parabola, and a hyperbola are shown below. Each of these equations may include a set of parameters that a processor may use to associate the curve identified in step 230 to relative motion of an object. Note that equations below include different variables (X & Y), constants (A, B, and/or C), and in one case a value of slope M. As one of ordinary skill in the art would understand, that while these equations represent curves mapped in a two-dimensional space (that include an X-axis and a Y-axis), similar equations may be used to represent mappings in three-dimensional space (that include an X-axis, a Y-axis, and a Z-axis). Equations associated with three-dimensional space may include parameters of an additional variable (e.g., Z) and potentially other constants. Note that as conventionally used, an X variable may relate to positions along a horizontal axis (from left to right), a Y variable may relate to positions along a vertical axis (up to down), and Z may relate to positions along a third axis that is associated with a distance (i.e., range) that an object is from the radar apparatus.

The equation for a line below includes variables X and Y, a slope represented by the letter M, and a constant represented by the letter B. This slope M classically corresponds to a change in a value of Y for a given change in a value of X. A general equation of a line is:

$$Y = MX + B$$

A general equation for a parabola shown below includes variables X and Y and constants represented by the letters A, B, and C:

$$Y = AX^2 + BX + C$$

The equation below for a hyperbola includes variables X and Y and constants A and B:

$$(X^2/A^2) - (Y^2/B^2) = 1$$

The equations shown above may be consistent with mapped radar signal data, and these equations or similar equations may be used by a processor executing instructions out of a memory when that processor identifies a type of curve to associate with the curve in step 230 of FIG. 2. This process may include matching X and Y values with slope M values and/or constants A, B, and/or C. A curve to associate with the received distorted radar signal data may be processed by the processor comparing points of the first mapping to identify whether the points have a slope that appears to be constant. Since received radar signals may be smeared and since these signals may also include noise, a mapping of these signals may not precisely conform to an equation of a curve. Mappings of a received radar signal points may not precisely conform to a straight line yet conform to a generally linear change in the mapping. Much like a set of experimental data that generally follows a line, a line may be associated with that set of experimental data when some data points appear to be above an approximated line, and other data points appear to be below the approximated line. As such, an average change in slope of a mapping of data points may be performed to identify whether that set of points conforms to a line within a statistical probability or by a threshold amount.

The processor may make similar determinations that allow the processor to identify whether a mapping corresponds to a parabola or a hyperbola that each does not have a constant slope, at least within a critical area of a mapping. Generally, a parabola corresponds to a single curve that changes geometrically according to a squared function, and a hyperbola corresponds to a set of two geometrically changing curves that form a mirror image around a center point. The processor may execute instructions that allow the processor to compare mapped data to specific curved shapes, and a specific shape may be associated with the mapping based on characteristics of the mapping being linear, conforming to a parabolic shape, or conforming to a hyperbolic shape. The processor may then execute instructions to identify values to assign to specific constants or a slope of a line as part of a curve fitting process.

Once the mapping of the first number of points has been fit to a curve, the processor may identify a compensation factor to associate with the curve in step 240 of FIG. 2. Note that since a mapping of a smeared set of radar data may be representative of a fast-moving object and a parabola may be associated with a slow-moving object, the first mapping of the received distorted radar signals may be associated with fast movement or with slow movement. Because of this, a compensation factor known to be consistent with fast movement (i.e., a line) may be identified by the processor. The identification of the compensation factor may also include reviewing parameters of a slope, specific values of the curve (X & Y), and/or constants (A & B) of the line. As such, different specific compensation factors may be associated with lines that have different parameters (different slopes, different values, and or different constants).

In an instance where the curve corresponds to a parabola, indicating a slower moving object, a compensation factor may be selected that is consistent with the shape of a parabola. Here again, a specific compensation factor may be selected from a set of compensation factors that correspond to the shape of a parabola. Here, parameters of the parabola (values of X & Y and/or constants A, B, & C) may be used to select a particular compensation factor of a plurality of compensation factors each of which are associated with a parabolic shape.

An identified compensation factor may allow the processor to algorithmically move points included in parts of the first mapping when generating a second number of points of the second mapping in step 250 of FIG. 2. Some of the points included in the first mapping may be added, resulting in a greater amount of radar signal energy being associated with areas of the second mapping as compared to the first mapping. Here, other areas of the second mapping may be associated with a lesser amount of radar signal energy being associated with areas of the second mapping as compared to the first mapping. The second mapping of the radar signal generated in step 250 may result in the second mapping being more precise than the first mapping based on the application of the compensation factor by the processor. In certain instances, the second mapping may include fewer points than the first mapping because the application of the compensation factor reduces the smearing of the original received distorted radar signal.

After step 260, the processor executing instructions out of the memory may identify a distance and/or velocity to associate with the relative motion between the antenna of the radar apparatus and the object. The method of FIG. 2 may then move back to step 210 where an additional radar signal distorted by relative motion is received again.

Figure 3:
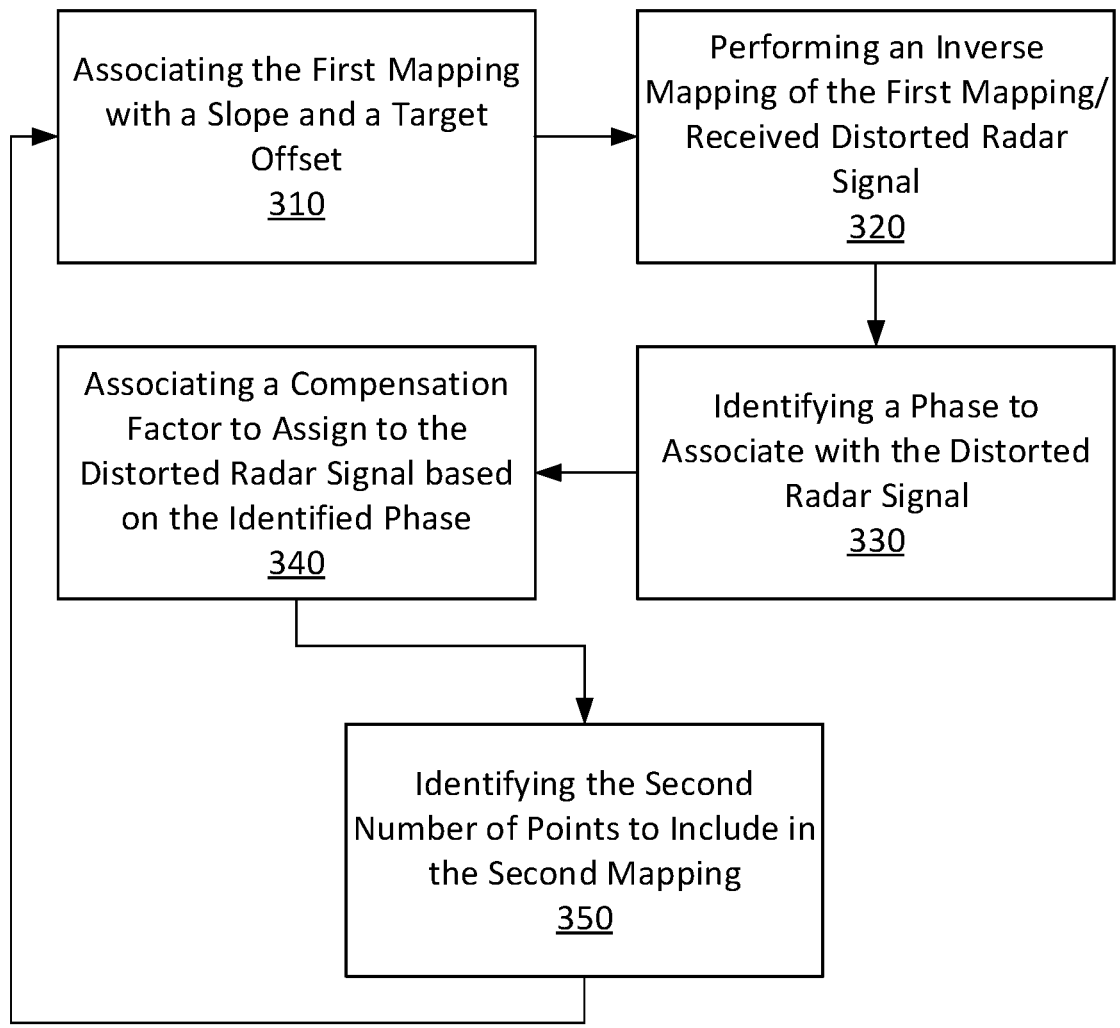
FIG. 3 illustrates a set of steps that may be performed when a curve fitting process is performed in accordance with some aspects of the present technology.

FIG. 3 illustrates a set of steps that may be performed when a curve fitting process is performed. Step 310 of FIG. 3 is when a processor executing instructions out of a memory may fit the first mapping to a curve. In step 310, the processor may identify a slope and a target offset to associate with the first mapping. When this slope corresponds to the slope of a line, the target offset may correspond to values of X and Y discussed above. Next, in step 320 of FIG. 3, an inverse mapping of the first mapping of the received distorted radar signals is performed. This inverse mapping may include identifying points of a curve that fit to a threshold degree points of the first mapping. A phase to associate with the distorted radar signal may be identified in step 330 of FIG. 3 from the points identified in the inverse mapping of step 320. A compensation factor or phase term may be determined based on the estimated trajectories of the vehicle and the target at the moment that data was acquired. By accounting for this effect, an appropriate phase offset can be applied to each target signature segment to compensate for motion smearing effects.

After step 330, the compensation factor discussed in FIG. 2 may be assigned to the first mapping in step 340 based on the phase identified in step 330. After this, the second number of points to include in the second mapping discussed in FIG. 2 may be identified in step 350 of FIG. 3. Here again this second mapping may include fewer points than the first mapping based on additions and/or subtractions performed by the processor that effectively move points from certain locations of the first mapping to other points of the second mapping.

Figure 4:
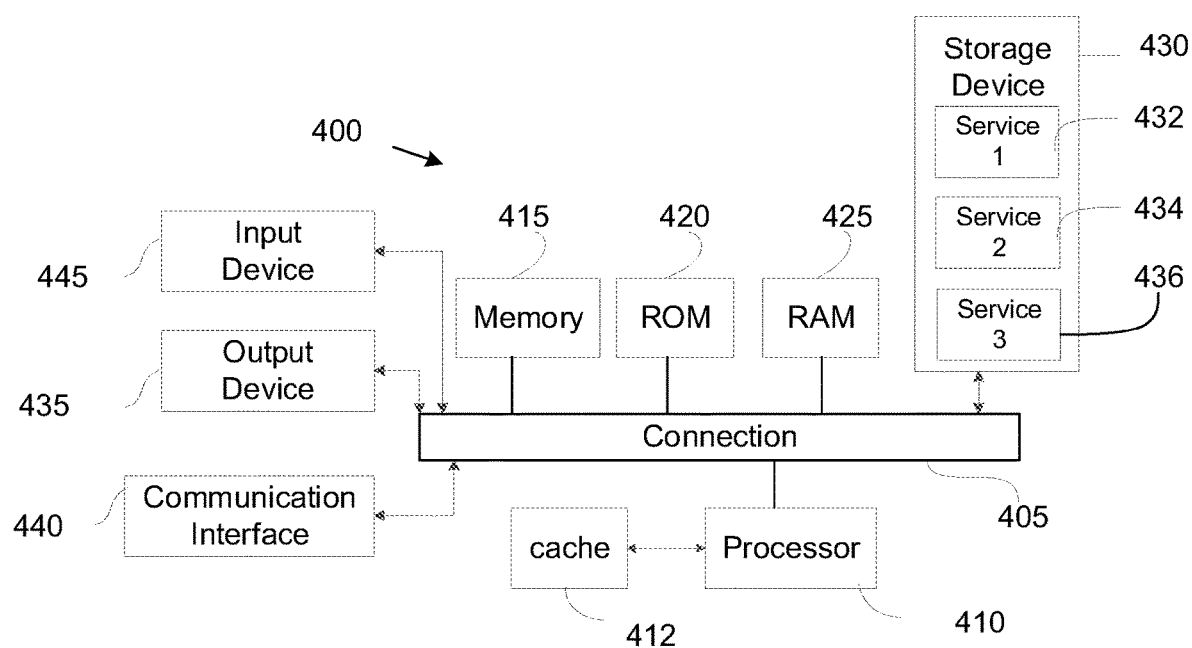
FIG. 4 shows an example of computing system 400 that may be used to implement at least some of the functions reviewed in the present disclosure in accordance with some aspects of the present technology.

FIG. 4 shows an example of computing system 400 that may be used to implement at least some of the functions reviewed in the present disclosure. In certain instances, a computing device may be incorporated into a sensing apparatus or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 442, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

Figure 5:
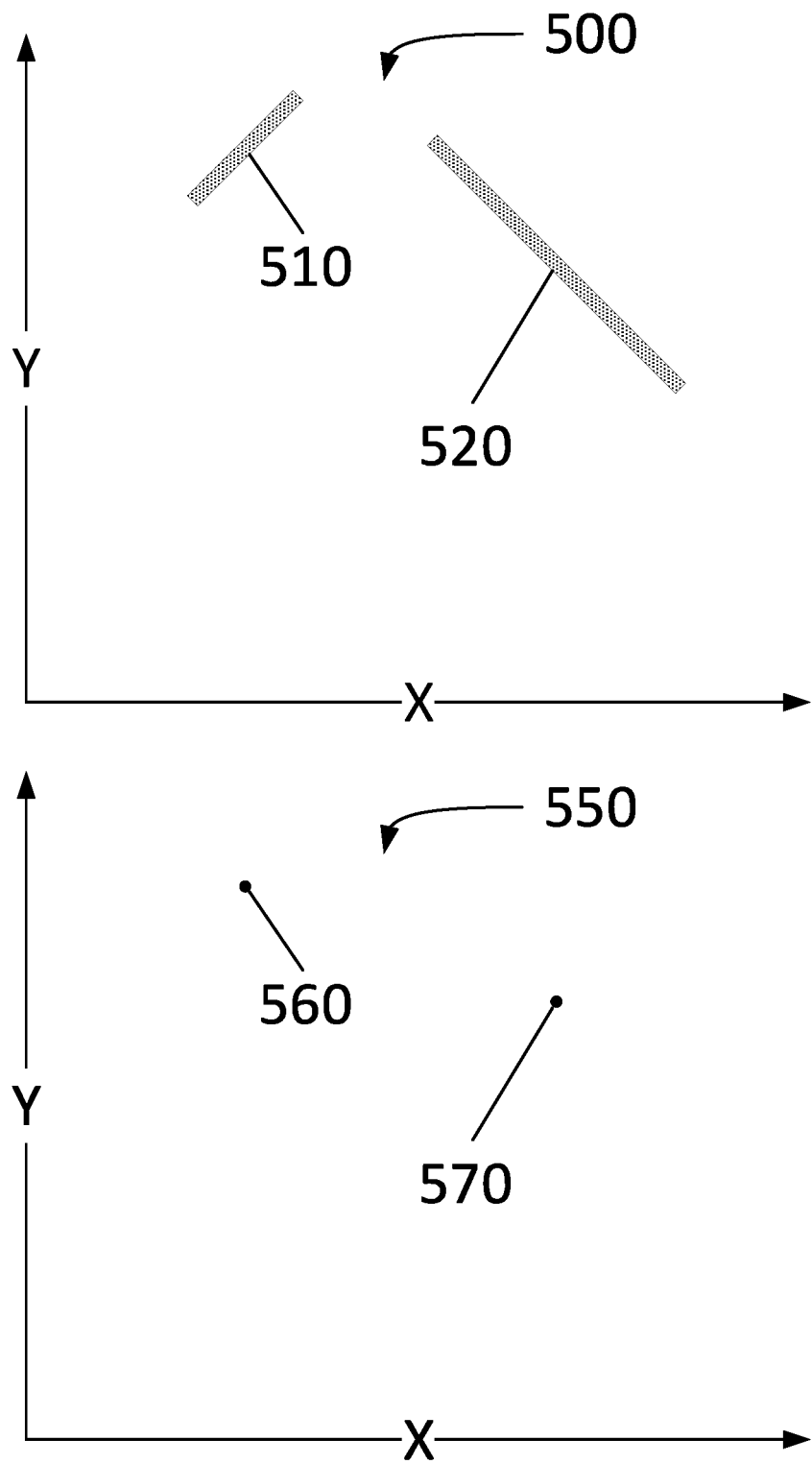
FIG. 5 illustrates two different mappings of radar data that include a first set of points of a received set of radar data and a second set of points associated with compensated radar data in accordance with some aspects of the present technology.

FIG. 5 illustrates two different mappings of radar data that include a first set of points of a received set of radar data and a second set of points associated with compensated radar data. The first mapping 500 of FIG. 5 corresponds to a set of smeared (distorted) radar data and the second mapping 550 of FIG. 5 corresponds to a set of compensated radar data after the smearing (distortions) in the first mapping 500 have been removed. The first mapping and the second mapping of FIG. 5 each include a respective X axis in a horizontal direction and a respective Y axis in a vertical direction.

The first mapping 500 of FIG. 5 includes a first line of smeared radar data 510 and a second line of smeared radar data 520 of FIG. 5. Here, the first set of smeared radar data 510 may correspond to a first object (i.e. target 1) and the second set of smeared radar data 520 may correspond to a second object (i.e. target 2). Each of these lines 510 and 520 have a different length, and a different slope, here a slope of each of these respective lines may correspond to a respective angle of relative motion between an antenna of a radar apparatus and each respective object (510 & 520) and each of the different lengths may correspond to a different velocity of the first object (target 1) and the second object (target 2).

The second mapping 550 of FIG. 5 includes a first point of radar data 560 and a second point of radar data 570, where the first point of radar data 560 may correspond to a location of the first object and the second point of data 570 may correspond to allocation of the second object.

Data included in the first and the second mapping of FIG. 5 is a graphical representation of data that may correspond to the first mappings and the second mappings discussed in respect to FIGS. 2-3 of the present disclosure. Note that points 560 and 570 of the second mapping 550 are located at a center point of lines 510 and 520 of the first mapping 500. The mappings of FIG. 5 illustrate that sets of smeared radar data may be processed to generate data that may more accurately reflect locations of objects that are detected by radar.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for evaluating received signals, the method comprising:
   receiving radar signals reflected off a first object having a relative motion with respect to an antenna of a radar apparatus that points in a first direction, the radar signals including a component that indicates that the first object has a relative motion in a second direction that is different from the first direction where the antenna of the radar apparatus points;
   the relative motion resulting in power of the received radar signals being distributed in a first mapping of the radar signals that includes a first number of points;
   identifying that the first number of points of the first mapping correspond to a first curve associated with a first parameter;
   identifying a compensation factor associated with the first parameter based on the association of the curve with the first parameter;
   performing calculations that apply the compensation factor associated with the first parameter to the first mapping of points to generate a second mapping of the radar signals that includes a second number of points, wherein the second number of points is fewer than the first number of points based on the compensation factor being applied in the calculations; and
   identifying a distance and velocity to associate with the relative motion based on the second mapping of the radar signals.

2. The method of claim 1, wherein the first number of points corresponds to a number greater than one and the second number of points corresponds to the number one.

3. The method of claim 1, further comprising identifying a signature to associate with the first mapping of the radar signals, wherein the first signature is associated with a first type of object.

4. The method of claim 1, further comprising associating the first mapping of the radar signals with a slope and a target offset of the first object.

5. The method of claim 4, wherein the slope and the target offset corresponds to a phase and a magnitude of the received radar signals.

6. The method of claim 1, further comprising performing an inverse mapping of the received radar signals when generating a two-dimensional rendering of a location that corresponds to the distance associated with the first object.

7. The method of claim 1, further comprising providing the second mapping such that a processor executing instructions associated with perceiving characteristics of the object.

8. The method of claim 1, wherein the calculations are associated with an azimuth, an elevation, a range, and the velocity of the relative motion.

9. The method of claim 1, wherein the compensation factor includes a phase that results in radar energy of the points of the first mapping constructively adding.

10. The method of claim 1, further comprising filtering the received radar signals to separate noise from the first number of points of the first mapping.

11. An apparatus for evaluating received signals, the apparatus comprising:
   a radar apparatus that:
      transmits radar signals,
      receives the radar signals after those radar signals have been reflected off a first object, the first object having a relative motion with respect to an antenna of the radar apparatus that points in a first direction, wherein:
         the radar signals include a component that indicates that the first object has a relative motion in a second direction that is different from the first direction where the antenna of the radar apparatus points, and
   the relative motion resulting in power of the received radar signals being distributed in a first mapping of the radar signals that includes a first number of points;
   a memory; and
   a processor that executes instructions out of the memory to:
      identify that the first number of points of the first mapping correspond to a first curve associated with a first parameter,
      identify a compensation factor associated with the first parameter based on the association of the curve with the first parameter, perform calculations that apply the compensation factor associated with the first parameter to the first mapping of points to generate a second mapping of the radar signals that includes a second number of points, wherein the second number of points is fewer than the first number of points based on the compensation factor being applied in the calculations, and
      identify a distance and velocity to associate with the relative motion based on the second mapping of the radar signals.

\* \* \* \* \*